United States Patent
Kitagawa et al.

(10) Patent No.: US 12,527,340 B2
(45) Date of Patent: Jan. 20, 2026

(54) RICE-DERIVED SWEETENER, FOOD PRODUCT CONTAINING RICE-DERIVED SWEETENER, AND METHOD FOR PRODUCING SAME

(71) Applicant: MARUKOME CO., LTD., Nagano (JP)

(72) Inventors: Manabu Kitagawa, Nagano (JP); Minami Yamada, Nagano (JP); Mayu Nishitake, Nagano (JP); Tasuku Kobayashi, Nagano (JP); Kozo Yamazaki, Nagano (JP)

(73) Assignee: MARUKOME CO., LTD., Nagano (JP)

( * ) Notice: Subject to any disclaimer, the term of this patent is extended or adjusted under 35 U.S.C. 154(b) by 303 days.

(21) Appl. No.: 18/016,749

(22) PCT Filed: May 27, 2021

(86) PCT No.: PCT/JP2021/020105
§ 371 (c)(1),
(2) Date: Jan. 18, 2023

(87) PCT Pub. No.: WO2022/018963
PCT Pub. Date: Jan. 27, 2022

(65) Prior Publication Data
US 2023/0284664 A1    Sep. 14, 2023

(30) Foreign Application Priority Data
Jul. 21, 2020   (JP) ................ 2020-124536

(51) Int. Cl.
*A23L 27/30*       (2016.01)
(52) U.S. Cl.
CPC .................. *A23L 27/33* (2016.08)

(58) Field of Classification Search
CPC .......... A23L 27/33; A23L 27/00; A23L 29/30
(Continued)

(56) References Cited

U.S. PATENT DOCUMENTS

| 4,756,912 A | 7/1988 | Mitchell et al. |
| 2007/0172511 A1 | 7/2007 | Harrison et al. |

(Continued)

FOREIGN PATENT DOCUMENTS

| CN | 86102356 A | 10/1987 |
| CN | 101827940 A | 9/2010 |

(Continued)

OTHER PUBLICATIONS

Office Action for CN Patent Application No. 202180060398.6, dated Jul. 12, 2024, 11 pages.

(Continued)

*Primary Examiner* — Subbalakshmi Prakash
(74) *Attorney, Agent, or Firm* — Casimir Jones, S.C.; Robert A. Goetz

(57) ABSTRACT

Provided is a rice-derived sweetener in which crystallization is inhibited. A rice-derived sweetener contains: a rice-derived component; glucose; and at least one saccharide selected from the group consisting of panose, maltotriose, and isomaltotriose, the glucose being contained in an amount of not less than 4.0% by mass and less than 47.2% by mass relative to a total mass of the rice-derived sweetener, and the panose, the maltotriose, and the isomaltotriose being contained in a total amount of more than 1.96% by mass and not more than 16.00% by mass relative to the total mass of the rice-derived sweetener.

10 Claims, 2 Drawing Sheets

(58) Field of Classification Search
USPC ........................................................ 426/548
See application file for complete search history.

(56) References Cited

U.S. PATENT DOCUMENTS

| | | |
|---|---|---|
| 2007/0172931 A1 | 7/2007 | Harrison et al. |
| 2007/0184177 A1 | 8/2007 | Harrison et al. |
| 2008/0175977 A1 | 7/2008 | Harrison et al. |
| 2010/0047432 A1 | 2/2010 | Harrison et al. |
| 2013/0216693 A1 | 8/2013 | Harrison et al. |
| 2015/0181918 A1 | 7/2015 | Harrison et al. |
| 2015/0282513 A1 | 10/2015 | Cook et al. |
| 2016/0081382 A1 | 3/2016 | Ahn |
| 2017/0356021 A1 | 12/2017 | Harrison et al. |
| 2018/0030489 A1 | 2/2018 | Harrison et al. |
| 2018/0371514 A1 | 12/2018 | Harrison et al. |
| 2020/0032309 A1 | 1/2020 | Harrison et al. |

FOREIGN PATENT DOCUMENTS

| | | |
|---|---|---|
| CN | 104171793 A | 12/2014 |
| CN | 109321471 A | 2/2019 |
| GB | 2001075 A | 1/1979 |
| JP | 54-011954 | 1/1979 |
| JP | 56-051982 | 5/1981 |
| JP | 07-059534 | 3/1995 |
| JP | 08-019390 | 1/1996 |
| JP | 2002-191316 | 7/2002 |
| JP | 2009-183264 A | 8/2009 |
| JP | 2010-022332 | 2/2010 |
| JP | 2013-042708 | 3/2013 |
| JP | 2014-193175 | 10/2014 |
| JP | 5887605 B1 | 3/2016 |
| KR | 820000329 B1 | 3/1982 |
| KR | 2015/0079791 A | 7/2015 |

OTHER PUBLICATIONS

"Simplified manufacturing method of producing a new sweetener using rice koji", Proceedings of Niigata forestry and fisheries industry research result reports (Year 2014), 2 pages.

Natsuko Nakajima et al., "Crystallization control of natural sweetener made of koji" Fukushima Prefecture Technology Centre Experimental Research Report, 2012, p. 108-111.

Written Opinion for PCT/JP2021/020105 and its English Translation, dated Jul. 20, 2021, 9 pages.

International Search Report for PCT/JP2021/020105 and its English Translation, dated Jul. 20, 2021, 5 pages.

Office Action for CN 202180060398.6 dated Feb. 2, 2024, 8 pages.

Office Action for KR Patent Application No. 10-2023-7005917, dated Feb. 14, 2025, 6 pages.

ved sweetener, and a food product containing a rice-derived sweetener, and a method for producing a rice-derived sweetener.

BACKGROUND ART

Along with a recent increase in health consciousness, a sweetener containing rice as a raw material has attracted attention as a secure and safe natural sweetener that can be used instead of sugar or an artificial sweetener. For example, Non-patent Literatures 1 and 2 each disclose a rice koji sweetener obtained by producing a saccharified rice koji solution (amazake) and concentrating filtrate of the saccharified rice koji solution.

CITATION LIST

Non-Patent Literatures

[Non-patent Literature 1]
Natsuko NAKAJIMA, et al., FY2012 Experiment and Research Report of Fukushima Technology Centre, p. 108-111, 2012
[Non-patent Literature 2]
FY2014 Collection of Reports on Results of Research on Agriculture, Forestry and Fishery Industry in Niigata Prefecture, "*Kome Koji wo Tsukatta Aratana Kanmiryo no Kan'i Seizouhou* [Simple Method for Producing New Sweetener Using Rice Koji]"

SUMMARY OF INVENTION

Technical Problem

However, a rice koji sweetener as described above has a problem in that sugars are crystallized during preservation of the rice koji sweetener. In particular, an increase in Brix of a rice koji sweetener by concentration results in easier crystallization of sugars. It is therefore required to inhibit crystallization of sugars in order to improve preservation stability as a product of a rice koji sweetener.

An aspect of the present invention has an object to provide a rice-derived sweetener in which crystallization is inhibited.

Solution to Problem

In order to attain the object, a rice-derived sweetener in accordance with an aspect of the present invention contains: a rice-derived component; glucose; and at least one saccharide selected from the group consisting of panose, maltotriose, and isomaltotriose, the glucose being contained in an amount of not less than 4.0% by mass and less than 47.2% by mass relative to a total mass of the rice-derived sweetener, and the panose, the maltotriose, and the isomaltotriose being contained in a total amount of more than 1.96% by mass and not more than 16.00% by mass relative to the total mass of the rice-derived sweetener.

Advantageous Effects of Invention

An aspect of the present invention makes it possible to provide a rice-derived sweetener in which crystallization is inhibited.

DESCRIPTION OF EMBODIMENTS

[Rice-Derived Sweetener]

Figure 1:
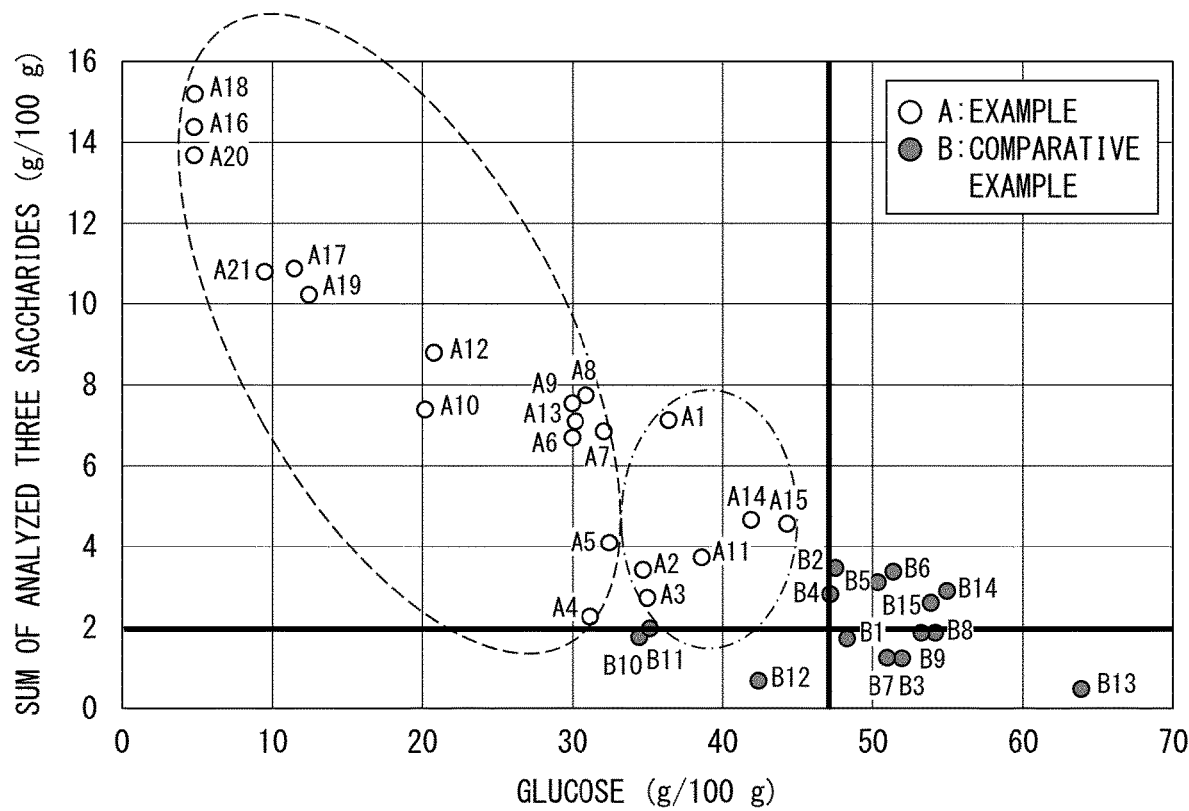
FIG. 1 is a diagram showing amounts of glucose and three saccharides contained in rice-derived sweeteners of Examples and Comparative Examples of the present invention.

A rice-derived sweetener in accordance with an aspect of the present invention contains: a rice-derived component; glucose; and at least one saccharide selected from the group consisting of panose, maltotriose, and isomaltotriose, the glucose being contained in an amount of not less than 4.0% by mass and less than 47.2% by mass relative to a total mass of the rice-derived sweetener, and the panose, the maltotriose, and the isomaltotriose being contained in a total amount of more than 1.96% by mass and not more than 16.00% by mass relative to the total mass of the rice-derived sweetener. For simplicity of description, panose, maltotriose, and isomaltotriose are herein collectively referred to as "three saccharides".

The rice-derived sweetener in accordance with an aspect of the present invention contains a rice-derived component. Thus, the rice-derived sweetener in accordance with an aspect of the present invention is referred to as a rice-derived sweetener. Note here that the "rice-derived component" refers to a component remaining in a sweetener after a saccharification step, a solid-liquid separation step, and a concentration step in a method for producing a rice-derived sweetener (described later). In a case where the rice-derived sweetener in accordance with an aspect of the present invention is obtained by a production method in which rice koji is used in the saccharification step, the rice-derived sweetener in accordance with an aspect of the present invention may be a rice-derived sweetener containing rice koji as one of raw materials. The rice-derived sweetener in accordance with an aspect of the present invention may further contain a rice koji-derived component by containing rice koji as a raw material. The "rice koji-derived component" refers to a component derived from rice koji (e.g., koji fungi per se, a partially decomposed product of koji fungi, or the like) among components remaining in a sweetener after the saccharification step, the solid-liquid separation step, and the concentration step in the method for producing a rice-derived sweetener (described later). A rice-derived sweetener containing rice koji as one of raw materials is also referred to as a "rice koji-derived sweetener".

In order to inhibit crystallization in a rice-derived sweetener, the rice-derived sweetener in accordance with an aspect of the present invention is more preferably configured such that the glucose is contained in an amount of not less than 4.0% by mass and not more than 45.00% by mass relative to the total mass of the rice-derived sweetener, and the panose, the maltotriose, and the isomaltotriose are contained in a total amount of not less than 2.00% by mass and not more than 15.50% by mass relative to the total mass of the rice-derived sweetener.

In a case where the rice-derived sweetener in accordance with an aspect of the present invention is configured such that the glucose is contained in an amount in the above range relative to the total mass of the rice-derived sweetener, and the three saccharides are contained in a total amount in the above range relative to the total mass of the rice-derived sweetener, the rice-derived sweetener in accordance with an aspect of the present invention can be a rice-derived sweetener in which crystallization is inhibited. Note here that the expression "crystallization is inhibited" herein refers to a state in which no crystal precipitation is observed by visual confirmation for not less than 45 days in a case where the rice-derived sweetener is preserved at an ordinary temperature (25° C.). No crystal precipitation is preferably observed for a longer period, and the rice-derived sweetener in accordance with an aspect of the present invention also includes a rice-derived sweetener in which no crystal precipitation is observed for not less than 12 months. The rice-derived sweetener in accordance with an aspect of the present invention also includes a rice-derived sweetener in which no crystal precipitation is observed by visual confirmation for not less than 45 days even in a case where the rice-derived sweetener is preserved not only at an ordinary temperature but also at a temperature of −20° C., 5° C., 30° C., or the like.

The rice-derived sweetener in accordance with an aspect of the present invention preferably further contains isomaltose. Isomaltose, panose, and isomaltotriose are referred to as "isomaltooligosaccharides". Isomaltooligosaccharides are known as components involved in food for specified health uses in Japan. In a case where the rice-derived sweetener in accordance with an aspect of the present invention contains isomaltose, panose, and isomaltotriose, such a rice-derived sweetener can be expected, as a functional food containing "isomaltooligosaccharides", to have an effect such as control of stomach function.

In a case where the rice-derived sweetener in accordance with an aspect of the present invention further contains isomaltose, the isomaltose, the panose, and the isomaltotriose are preferably contained in a total amount of not less than 0.4% by mass relative to the total mass of the rice-derived sweetener. Furthermore, an estimated daily intake of isomaltooligosaccharide for food for specified health uses in Japan is 10 g. In a case where 20% by weight of isomaltooligosaccharide is contained in a rice-derived sweetener, this estimated daily intake is reached by ingestion of 50 g of the rice-derived sweetener. Thus, the isomaltose, the panose, and the isomaltotriose are more preferably contained in a total amount of not less than 20.00% by mass and not more than 23.00% by mass relative to the total mass of the rice-derived sweetener.

The rice-derived sweetener in accordance with an aspect of the present invention preferably has a Brix of not less than 70% from the viewpoint of obtaining a sufficient degree of sweetness, and preferably has a Brix of not less than 72% from the viewpoint of safety in microbial control. Furthermore, the rice-derived sweetener in accordance with an aspect of the present invention preferably has a Brix of not more than 80% from the viewpoint of usability of a rice-derived sweetener. Brix represents the sugar content. Brix is used as an indicator of sweetness. The Brix of a rice-derived sweetener in accordance with an aspect of the present invention can be measured by a method known to a person skilled in the art, and can be measured, for example, by a method disclosed in Examples described later. For example, sweet sake commonly has a Brix of 40% to 60%. This also makes it possible to say that the rice-derived sweetener in accordance with an aspect of the present invention has sufficiently high Brix.

The rice-derived sweetener in accordance with an aspect of the present invention preferably has a water activity (Aw) of not less than 0.60, and more preferably not less than 0.65 from the viewpoint of usability of a rice-derived sweetener. Furthermore, the water activity is preferably not more than 0.85 from the viewpoint of enhancing preservability of a rice-derived sweetener by controlling growth of miscellaneous bacteria. Water activity (abbreviated as "Aw") is a numerical value representing a proportion of free water in a food product, and is used as an indicator of preservability of a food product. The water activity of the rice-derived sweetener in accordance with an aspect of the present invention can be measured by a method known to a person skilled in the art, and can be measured, for example, by a method disclosed in the Examples described later.

The rice-derived sweetener in accordance with an aspect of the present invention can be produced by a production method described later. Furthermore, the rice-derived sweetener in accordance with an aspect of the present invention may optionally contain a component other than the components listed earlier, if necessary. Examples of such a component include components ordinarily used as food additives, such as a preservative, an antioxidant, a perfume, a pH regulator, a thickener, and an acidulant.

The rice-derived sweetener in accordance with an aspect of the present invention has sufficient Brix as a sweetener and has excellent preservation stability and excellent handleability due to inhibited crystallization. Furthermore, an aspect of the present invention has excellent preservation stability and excellent handleability also due to inhibited growth of miscellaneous bacteria. Thus, the rice-derived sweetener in accordance with an aspect of the present invention can be suitably used as a secure and safe natural sweetener which is sweet enough to be used instead of sugar or an artificial sweetener, in which crystallization is inhibited, and in which growth of miscellaneous bacteria is inhibited.

A food product containing the rice-derived sweetener in accordance with an aspect of the present invention is also encompassed in the scope of the present invention. Such a food product is not particularly limited in form. Examples of the food product include powders, sherbets, candies, supplements, and pharmaceutical compositions. The food product also includes beverages. For example, a beverage obtained by dissolving a rice-derived sweetener in water or the like is also within the scope of the present invention. An amount of the rice-derived sweetener contained in the food product is not particularly limited and can be set as appropriate if necessary.

[Method for Producing Rice-Derived Sweetener]

A method for producing a rice-derived sweetener in accordance with an aspect of the present invention includes: a saccharification step of saccharifying a saccharification material containing rice, water, and an enzymatic agent; a solid-liquid separation step of subjecting a saccharified product obtained in the saccharification step to solid-liquid separation so as to obtain a saccharified solution; and a concentration step of concentrating the saccharified solution.

(Saccharification Step)

In the saccharification step, the saccharification material containing rice, water, and an enzymatic agent is saccharified. The saccharification material may or need not contain rice koji, but preferably contains rice koji in order to promote saccharification of the saccharification material. A rice-derived sweetener obtained with use of rice koji may contain a rice koji-derived koji fungi. The "rice koji-derived koji fungi" contained in the rice-derived sweetener may be a live fungus, a killed fungus, or a partially decomposed product of koji fungi.

A saccharification condition in the saccharification step is not particularly limited provided that saccharification of the saccharification material occurs under the saccharification condition. For example, the saccharification step may be carried out at not lower than 50° C. and not higher than 60° C. (preferably, 53° C.) over a period of not less than 3 hours and not more than 30 hours, and preferably not less than 15 hours and not more than 25 hours.

The rice is not particularly limited in type. The rice may be, for example, non-glutinous rice, glutinous rice, or rice for sake. In an aspect of the present invention, the rice may be pregelatinized rice obtained by pregelatinizing starch. Furthermore, in an aspect of the present invention, rice obtained by immersing dried rice in water and then cooking the immersed rice into pregelatinized rice may be used as the saccharification material. Moreover, in an aspect of the present invention, the rice may be alternatively steamed rice.

An amount of the rice contained in the saccharification material is not particularly limited, and may be adjusted as appropriate so that the glucose and the three saccharides in the rice-derived sweetener have a composition in the range described earlier. For example, in an aspect of the present invention, the saccharification material that contains no rice koji contains rice in an amount of preferably not less than 20% by mass and not more than 40% by mass relative to a total mass of 100% by mass of the saccharification material.

In an aspect of the present invention, the saccharification material that contains rice koji as described later contains rice in an amount of preferably not less than 20% by mass and not more than 40% by mass relative to the total mass of 100% by mass of the saccharification material.

An enzymatic agent containing an enzyme that promotes a saccharification reaction of starch is used as the enzymatic agent. Examples of the enzyme that promotes the saccharification reaction of starch include a starch liquefying enzyme, a starch saccharifying enzyme, a glycosyltransferase, and pullulanase. Examples of the starch liquefying enzyme include α-amylase. Examples of the starch saccharifying enzyme include maltotriohydrodase, β-amylase, and glucoamylase. Examples of the glycosyltransferase include transglucosidase. These enzymes may be used alone or in combination of two or more of the enzymes.

An amount of the enzymatic agent contained may be set as appropriate in accordance with an amount of a raw material substrate (rice or rice koji). In a case where two or more kinds of enzymatic agents are used in combination, an amount of each of the enzymatic agents contained in the saccharification material may be adjusted so as to be in the range described earlier.

The rice koji may be prepared in accordance with an ordinary method for producing rice koji. For example, the rice koji is obtained by spraying koji fungi on steamed rice obtained by steaming rice, and propagating the koji fungi under an optimum condition for koji fungi (e.g., not lower than 25° C. and not higher than 40° C.). The rice koji may be commercially available rice koji.

The koji fungi are not particularly limited provided that the koji fungi are koji fungi for use in ordinary rice koji production. Examples of the koji fungi include *Aspergillus oryzae* and *Aspergillus luchuensis* mut. *kawachii*.

In a case where the saccharification material contains rice koji, an amount of the rice koji contained in the saccharification material is not particularly limited, and may be adjusted as appropriate so that the glucose and the three saccharides in the rice-derived sweetener have the composition in the range described earlier. For example, in order to promote saccharification of the saccharification material, the rice koji is contained in the saccharification material in an amount of preferably not less than 2% by mass relative to the total mass of 100% by mass of the saccharification material. Furthermore, in order to inhibit crystallization in a rice-derived sweetener, the rice koji is contained in the saccharification material in an amount of preferably less than 14% by mass relative to the total mass of 100% by mass of the saccharification material.

The rice-derived sweetener in which crystallization is inhibited can be produced by adjusting, to not less than 2% by mass and less than 14% by mass, the amount of the rice koji contained in the saccharification material.

The remainder of the saccharification material other than the rice, the enzymatic agent, and the rice koji can be water.

In an aspect of the present invention, the saccharification step may include a first saccharification step of saccharifying a first saccharification material containing rice, water, and an enzymatic agent, and a second saccharification step of saccharifying a second saccharification material containing rice koji and a first saccharified product obtained in the first saccharification step. An amount of the rice koji contained in the saccharification material is not particularly limited, and may be adjusted as appropriate so that the glucose and the three saccharides in the rice-derived sweetener have the composition in the range described earlier. In a case where the first saccharification material containing no rice koji is thus saccharified in the first saccharification step, and the second saccharification material containing rice koji is thus saccharified in the second saccharification step, the rice-derived sweetener in which crystallization is inhibited can be produced by carrying out the saccharification step by adding more rice koji than in a production method in which the saccharification step is carried out in one step.

For example, in order to promote saccharification, the rice koji is contained in the second saccharification material in an amount of preferably not less than 2% by mass relative to a total mass of 100% by mass of the second saccharification material. Furthermore, in order to inhibit crystallization in a rice-derived sweetener, the rice koji is contained in the second saccharification material in an amount of preferably not more than 20% by mass relative to the total mass of 100% by mass of the second saccharification material.

The respective amounts of the rice and the enzymatic agent that are contained in the first saccharification material in a case where the saccharification step includes the first saccharification step and the second saccharification step are as the respective amounts of the rice and the enzymatic agent that are contained in the saccharification material containing no rice koji have been described.

(Solid-Liquid Separation Step)

In the solid-liquid separation step, a saccharified product obtained in the saccharification step is subjected to solid-liquid separation so that a saccharified solution is obtained. Note here that "solid-liquid separation" is intended to separate a solid content and a liquid in a saccharified product. A method of solid-liquid separation is not particularly limited. Examples of the solid-liquid separation include solid-liquid separation with use of a horizontal filter press and solid-liquid separation with use of a centrifugal separator. By subjecting the saccharified product obtained in the saccharification step to solid-liquid separation, it is possible to obtain a clear saccharified solution containing no solid content (e.g., pomace).

(Concentration Step)

In the concentration step, the saccharified solution obtained in the solid-liquid separation step is concentrated. By concentrating the saccharified solution, the saccharified solution can have a Brix value and a water activity that are adjusted in the respective desired ranges described in the above section "Rice-derived sweetener". A method for concentrating the saccharified solution is not particularly limited. Examples of the method for concentrating the saccharified solution include heat concentration and vacuum concentration. By carrying out the concentration step so as to improve the Brix value, it is possible to produce a sufficiently sweet rice-derived sweetener without adding sugar, any artificial sweetener, or the like. Furthermore, by carrying out the concentration step so as to adjust the water activity, it is possible to provide a rice-derived sweetener in which growth of miscellaneous bacteria is inhibited. Moreover, crystallization is inhibited in a rice-derived sweetener of an aspect of the present invention as described earlier. An aspect of the present invention therefore makes it possible to produce a novel rice-derived sweetener in which crystallization is inhibited, which is sufficiently sweet, and in which growth of miscellaneous bacteria is inhibited.

(Other Step)

A production method in accordance with an aspect of the present invention may further include, before the solid-liquid separation step, a heating step of heating the saccharified product obtained in the saccharification step. The heating step is also referred to as a pasteurization step. By heating the saccharified product obtained in the saccharification step, it is possible to deactivate the enzymatic agent and the koji fungi that are contained in the saccharified product. This allows the rice-derived sweetener to have higher quality stability. A heating condition in the heating step is not particularly limited provided that the enzymatic agent and the koji fungi that are contained in the saccharified product can be deactivated under the heating condition. For example, the saccharified product may be heated at 90° C. for 30 minutes.

Furthermore, the conditions under which the steps described earlier are carried out may be set as appropriate so as to satisfy the composition of the glucose and the three saccharides of the rice-derived sweetener of an aspect of the present invention. For example, a person skilled in the art can adjust the conditions, under which the steps are carried out, by carrying out the steps described earlier and then measuring and preparing the amount of the glucose and the amounts of the three saccharides. Moreover, an aspect of a method for producing a rice-derived sweetener of the present invention may include a step of measuring amounts of glucose and the three saccharides so as to determine whether the amounts satisfy a composition of the glucose and the three saccharides. Further, a necessary component such as Brix may be measured as appropriate.

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be expressed as follows:

A rice-derived sweetener in accordance with a first aspect of the present invention is a rice-derived sweetener containing: a rice-derived component; glucose; and at least one saccharide selected from the group consisting of panose, maltotriose, and isomaltotriose, the glucose being contained in an amount of not less than 4.0% by mass and less than 47.2% by mass relative to a total mass of the rice-derived sweetener, and the panose, the maltotriose, and the isomaltotriose being contained in a total amount of more than 1.96% by mass and not more than 16.00% by mass relative to the total mass of the rice-derived sweetener.

In a second aspect of the present invention, a rice-derived sweetener may be configured such that, in the first aspect, the glucose is contained in an amount of not less than 4.0% by mass and not more than 45.00% by mass relative to the total mass of the rice-derived sweetener, and the panose, the maltotriose, and the isomaltotriose are contained in a total amount of not less than 2.00% by mass and not more than 15.50% by mass relative to the total mass of the rice-derived sweetener.

In a third aspect of the present invention, a rice-derived sweetener may be configured in the first or second aspect to further contain isomaltose, the isomaltose, the panose, and the isomaltotriose being contained in a total amount of not less than 0.4% by mass and not more than 23.00% by mass relative to the total mass of the rice-derived sweetener.

In a fourth aspect of the present invention, a rice-derived sweetener may be configured such that, in any one of the first through third aspects, the rice-derived sweetener has a Brix of not less than 70% and not more than 80%.

In a fifth aspect of the present invention, a rice-derived sweetener may be configured such that, in any one of the first through fourth aspects, the rice-derived sweetener has a water activity of not less than 0.60 and not more than 0.85.

In a sixth aspect of the present invention, a food product may be configured to contain a rice-derived sweetener recited in any one of the first through fifth aspects.

A production method in accordance with a seventh aspect of the present invention may be a method for producing a rice-derived sweetener recited in the first aspect, including: a saccharification step of saccharifying a saccharification material containing rice, water, and an enzymatic agent; a solid-liquid separation step of subjecting a saccharified product obtained in the saccharification step to solid-liquid separation so as to obtain a saccharified solution; and a concentration step of concentrating the saccharified solution.

In an eighth aspect of the present invention, a production method may be configured such that, in the seventh aspect, the saccharification material contains rice koji in an amount of not less than 2% by mass and less than 14% by mass relative to a total mass of 100% by mass of the saccharification material.

In a ninth aspect of the present invention, a production method may be configured such that, in the seventh aspect, the saccharification step includes: a first saccharification step of saccharifying a first saccharification material containing rice, water, and an enzymatic agent; and a second saccharification step of saccharifying a second saccharification material containing rice koji and a first saccharified product obtained in the first saccharification step.

In a tenth aspect of the present invention, a production method may be configured such that, in the ninth aspect, the second saccharification material contains the rice koji in an amount of not less than 2% by mass and not more than 20% by mass relative to a total mass of 100% by mass of the second saccharification material.

EXAMPLES

An example of the present invention will be described below.
(Rice Koji)

Koji fungi (strain names: *Aspergillus oryzae* No. 5100 strain (hereinafter referred to as *A. oryzae* No. 5100 strain), *Aspergillus luchuensis* mut. *kawachii* No. 5034 strain (hereinafter referred to as *A. kawachii* No. 5034 strain), and *Aspergillus oryzae* No. 5030 strain (hereinafter referred to as *A. oryzae* No. 5030 strain)) purchased from Higuchi Matsunosuke Shoten Co., Ltd. were inoculated into rice so that rice koji was produced.
(Rice)

Pregelatinized rice was obtained by pregelatinizing starch by treating raw rice with added water and heat, and then drying the starch.

Domestically grown rice was pregelatinized and used without being dried.

Foreign-grown rice was pregelatinized and used without being dried.
(Enzymatic Agent)

α-amylase, β-amylase, transglucosidase, and pullulanase were used alone or in combination as appropriate.

Production of Rice-Derived Sweetener

Example 1

A first saccharification material was prepared by mixing pregelatinized rice, an enzymatic agent, and water, and the first saccharification material was saccharified at 53° C. for 15 hours (a first saccharification step). Dried rice koji (*A. oryzae* No. 5100 strain) was added to a resulting first saccharified product so that a second saccharification material was prepared, and the second saccharification material was further saccharified at 53° C. for 6 hours (a second saccharification step). A resulting second saccharified product was placed in a pot and heated at 90° C. for 30 minutes so as to be subjected to pasteurization (a heating step). The second saccharified product having been subjected to pasteurization was pressed by a manual press (manufactured by ADOUR), then centrifuged at 14,000 rpm (17,800×g) for 3 minutes, and filtered with use of a No. 2 Filter Paper (manufactured by ADVANTEC TOYO KAISYA, LTD.), so that filtrate (a saccharified solution) was obtained (a solid-liquid separation step). The obtained filtrate was concentrated by an evaporator (a concentration step), so that a rice-derived sweetener of Example 1 was obtained.

In Example 1, as shown in Table 1, 23% by mass of pregelatinized rice, 18% by mass of dried rice koji (*A. oryzae* No. 5100 strain), and 59% by mass of water were blended, and α-amylase, β-amylase, and transglucosidase were added so as to achieve starch dextrinizing activity of not less than 164 U, starch saccharifying activity of not less than 14 U, and transglucosidase activity of not less than 12300 U per 41 g of a substrate (a total amount of the rice and the rice koji, same applies to the following description).

Example 2

A rice-derived sweetener of Example 2 was obtained by the same method as in Example 1, except that per 41 g of the substrate, the starch dextrinizing activity was set at not less than 328 U, the starch saccharifying activity was set at not less than 29 U, and the transglucosidase activity was set at not less than 24600 U.

Example 3

A rice-derived sweetener of Example 3 was obtained by the same method as in Example 1, except that per 41 g of the substrate, the starch dextrinizing activity was set at not less than 492 U, the starch saccharifying activity was set at not less than 43 U, and the transglucosidase activity was set at not less than 36900 U.

Example 4

As shown in Table 1, 30% by mass of domestically grown rice, 5% by mass of dried rice koji (*A. oryzae* No. 5100 strain), and 65% by mass of water were blended, and α-amylase was added so as to achieve starch dextrinizing activity of not less than 1345 U per 35 g of a substrate. A saccharification material thus obtained was saccharified at 53° C. for 15 hours (a saccharification step). A resulting saccharified product was subjected to pasteurization in the same manner as in Example 1 (a heating step). The saccharified product having been subjected to pasteurization was subjected to solid-liquid separation in the same manner as in Example 1, so that filtrate (a saccharified solution) was obtained (a solid-liquid separation step). The obtained filtrate was concentrated in the same manner as in Example 1 (a concentration step), so that a rice-derived sweetener of Example 4 was obtained.

Example 5

A rice-derived sweetener of Example 5 was obtained by the same method as in Example 4, except that pullulanase was further used as an enzymatic agent so as to achieve pullulanase activity of not less than 210 U.

Example 6

A rice-derived sweetener of Example 6 was obtained by the same method as in Example 4, except that α-amylase, β-amylase, and transglucosidase were added as an enzymatic agent so as to achieve starch dextrinizing activity of not less than 1240 U, starch saccharifying activity of not less than 12 U, and transglucosidase activity of not less than 10500 U per 35 g of a substrate.

Example 7

A rice-derived sweetener of Example 7 was obtained by the same method as in Example 4, except (i) that α-amylase, β-amylase, and transglucosidase were added as an enzymatic agent so as to achieve starch dextrinizing activity of not less than 1240 U, starch saccharifying activity of not less than 12 U, and transglucosidase activity of not less than 10500 U per 35 g of a substrate, (ii) that in the heating step, the saccharified product was subjected to pasteurization with use of a continuous heat sterilizer instead of being heated in the pot, and (iii) that in the solid-liquid separation step, solid-liquid separation was carried out by using a horizontal filter press instead of pressing by the manual press, centrifugation, and filtration.

Example 8

A rice-derived sweetener of Example 8 was obtained by carrying out the same method as in Example 6, and production lots of the rice-derived sweeteners of Examples 6 and 8 are different.

Example 9

A rice-derived sweetener of Example 9 was obtained by the same method as in Example 4, except (i) that α-amylase, β-amylase, and transglucosidase were added as an enzymatic agent so as to achieve starch dextrinizing activity of not less than 1240 U, starch saccharifying activity of not less than 12 U, and transglucosidase activity of not less than 10500 U per 35 g of a substrate and (ii) that the rice-derived sweetener of Example 9 contains 30% by mass of foreign-grown rice instead of domestically grown rice.

Comparative Example 1

As shown in Table 2, 27% by mass of domestically grown rice, 14% by mass of dried rice koji (*A. oryzae* No. 5100 strain), and 59% by mass of water were blended, and α-amylase was added so as to achieve starch dextrinizing activity of not less than 2000 U per 41 g of a substrate. A saccharification material thus obtained was saccharified at 53° C. for 15 hours (a saccharification step). A continuous heat sterilizer was used to subject a resulting saccharified product to pasteurization (a heating step). The saccharified product having been subjected to pasteurization was subjected to solid-liquid separation with use of a horizontal filter press and filtered with use of a 0.45 μm filter (manufactured by ADVANTEC TOYO KAISYA, LTD.), so that filtrate (a saccharified solution) was obtained (a solid-liquid separation step). The obtained filtrate was concentrated in the same manner as in Example 1 (a concentration step), so that a rice-derived sweetener of Comparative Example 1 was obtained.

Comparative Example 2

As shown in Table 2, 23% by mass of pregelatinized rice, 18% by mass of dried rice koji (*A. oryzae* No. 5100 strain), and 59% by mass of water were blended, and α-amylase, β-amylase, and transglucosidase were added so as to achieve starch dextrinizing activity of not less than 164 U, starch saccharifying activity of not less than 14 U, and transglucosidase activity of not less than 12300 U per 41 g of a substrate. A saccharification material thus obtained was saccharified at 53° C. for 15 hours (a saccharification step). A resulting saccharified product was subjected to pasteurization in the same manner as in Example 1 (a heating step). The saccharified product having been subjected to pasteurization was subjected to solid-liquid separation with use of a manual press (manufactured by ADOUR) and filtered with use of No. 2 Filter Paper, so that filtrate (a saccharified solution) was obtained (a solid-liquid separation step). The obtained filtrate was concentrated in the same manner as in Example 1 (a concentration step), so that a rice-derived sweetener of Comparative Example 2 was obtained.

Comparative Example 3

A rice-derived sweetener of Comparative Example 3 was obtained by the same method as in Comparative Example 2, except that the saccharification material contained 18% by mass of dried rice koji (*A. kawachii* No. 5034 strain) instead of the dried rice koji (*A. oryzae* No. 5100 strain).

Comparative Example 4

A rice-derived sweetener of Comparative Example 4 was obtained by the same method as in Comparative Example 2, except that the saccharification material contained 18% by mass of dried rice koji (*A. oryzae* No. 5030 strain) instead of the dried rice koji (*A. oryzae* No. 5100 strain).

Comparative Example 5

A rice-derived sweetener of Comparative Example 5 was obtained by the same method as in Comparative Example 2, except (i) that the saccharification material contained 18% by mass of dried rice koji (*A. oryzae* No. 5030 strain) instead of the dried rice koji (*A. oryzae* No. 5100 strain) and (ii) that in the solid-liquid separation step, the saccharified product having been subjected to pasteurization was subjected to solid-liquid separation with use of a manual press (manufactured by ADOUR), centrifuged at 14,000 rpm (17,800×g) for 10 minutes, and filtered with use of No. 2 Filter Paper (ADVANTEC TOYO KAISYA, LTD.), so that filtrate (a saccharified solution) was obtained.

Comparative Example 6

A rice-derived sweetener of Comparative Example 6 was obtained by the same method as in Comparative Example 2, except that in the solid-liquid separation step, solid-liquid separation was carried out in the same manner as in Comparative Example 5, so that filtrate (a saccharified solution) was obtained.

Comparative Example 7

As shown in Table 2, 27% by mass of domestically grown rice, 14% by mass of dried rice koji (*A. oryzae* No. 5100 strain), and 59% by mass of water were blended, and α-amylase was added so as to achieve starch dextrinizing activity of not less than 2000 U per 41 g of a substrate. A saccharification material thus obtained was saccharified at 53° C. for 15 hours (a saccharification step). A resulting saccharified product was subjected to pasteurization in the same manner as in Comparative Example 1 (a heating step). The saccharified product having been subjected to pasteurization was subjected to solid-liquid separation with use of a horizontal filter press and filtered with use of No. 2 Filter Paper, so that filtrate (a saccharified solution) was obtained (a solid-liquid separation step).

In Comparative Example 7, to a total amount of the filtrate obtained from 100 g of the saccharified product, α-amylase, β-amylase, and transglucosidase were added so as to achieve starch dextrinizing activity of not less than 164 U, starch saccharifying activity of not less than 14 U, and transglucosidase activity of not less than 12300 U, and a resulting mixture was further saccharified at 53° C. for 6 hours. A resulting saccharified product was placed in a pot and heated at 90° C. for 30 minutes so as to be subjected to pasteurization. Thereafter, the saccharified product was concentrated in the same manner as in Example 1 (a concentration step), so that a rice-derived sweetener of Comparative Example 7 was obtained.

Comparative Example 8

To a total amount of a rice-derived sweetener (concentrated saccharified solution) obtained from 100 g of a saccharified product obtained in the same manner as in Comparative Example 1 except that filtration after solid-liquid separation was carried out with use of No. 2 Filter Paper instead of the 0.45 μm filter, α-amylase, β-amylase, and transglucosidase were added so as to achieve starch dextrinizing activity of not less than 164 U, starch saccharifying activity of not less than 14 U, and transglucosidase activity of not less than 12300 U, and a resulting mixture was further saccharified at 53° C. for 6 hours. A resulting saccharified product was placed in a pot and heated at 90° C. for 30 minutes so as to be subjected to pasteurization, so that a rice-derived sweetener of Comparative Example 8 was obtained.

Comparative Example 9

A rice-derived sweetener of Comparative Example 9 was obtained by the same method as in Comparative Example 8, except that to a total amount of a rice-derived sweetener (concentrated saccharified solution) obtained from 100 g of a saccharified product in the same manner as in Comparative Example 1 except that filtration after solid-liquid separation was carried out with use of No. 2 Filter Paper instead of the 0.45 µm filter, glucoamylase was added so as to achieve starch saccharifying activity of not less than 1600 U, and a resulting mixture was further saccharified at 53° C. for 6 hours.

Comparative Example 10

As shown in Table 3, 35% by mass of pregelatinized rice, 6% by mass of dried rice koji (*A. oryzae* No. 5100 strain), and 59% by mass of water were blended, and β-amylase was added so as to achieve starch saccharifying activity of not less than 27 U per 41 g of a substrate. A saccharification material thus obtained was saccharified at 53° C. for 15 hours (a saccharification step). A resulting saccharified product was subjected to pasteurization in the same manner as in Example 1 (a heating step). The saccharified product having been subjected to pasteurization was subjected to solid-liquid separation in the same manner as in Example 1, so that filtrate (a saccharified solution) was obtained (a solid-liquid separation step). The obtained filtrate was concentrated in the same manner as in Example 1 (a concentration step), so that a rice-derived sweetener of Comparative Example 10 was obtained.

Comparative Example 11

A rice-derived sweetener of Comparative Example 11 was obtained by the same method as in Comparative Example 10, except that α-amylase was added as an enzymatic agent so as to achieve starch dextrinizing activity of not less than 287 U.

Comparative Example 12

As Comparative Example 12, a rice koji-derived sweetener manufactured by Company A was used. The rice koji-derived sweetener is obtained by concentrating amazake at a low temperature.

Comparative Example 13

Amazake manufactured by Company B was subjected to solid-liquid separation in the same manner as in Comparative Example 2, so that filtrate (a saccharified solution) was obtained (a solid-liquid separation step). To a total amount of the filtrate obtained from 100 g of the amazake, α-amylase, β-amylase, and transglucosidase were added so as to achieve starch dextrinizing activity of not less than 160 U, starch saccharifying activity of not less than 14 U, and transglucosidase activity of not less than 12000 U, and a resulting mixture was further saccharified at 53° C. for 6 hours. A resulting saccharified product was subjected to pasteurization in the same manner as in Example 1. The saccharified product having been subjected to pasteurization was concentrated in the same manner as in Example 1 (a concentration step), so that a rice-derived sweetener of Comparative Example 13 was obtained.

Example 10

As shown in Table 4, 31% by mass of domestically grown rice, 2% by mass of dried rice koji (*A. oryzae* No. 5100 strain), and 67% by mass of water were blended, and α-amylase and pullulanase were added so as to achieve starch dextrinizing activity of not less than 1381 U and pullulanase activity of not less than 198 U per 33 g of a substrate. A saccharification material thus obtained was saccharified at 53° C. for 15 hours (a saccharification step). A resulting saccharified product was subjected to pasteurization in the same manner as in Example 1 (a heating step). The saccharified product having been subjected to pasteurization was subjected to solid-liquid separation in the same manner as in Comparative Example 5, so that filtrate (a saccharified solution) was obtained (a solid-liquid separation step). The obtained filtrate was concentrated in the same manner as in Example 1 (a concentration step), so that a rice-derived sweetener of Example 10 was obtained.

Example 11

A rice-derived sweetener of Example 11 was obtained by the same method as in Example 10, except that 30% by mass of domestically grown rice, 6% by mass of dried rice koji (*A. oryzae* No. 5100 strain), and 64% by mass of water were used, and α-amylase and pullulanase were added so as to achieve starch dextrinizing activity of not less than 1352 U and pullulanase activity of not less than 216 U per 36 g of a substrate.

Comparative Example 14

A rice-derived sweetener of Comparative Example 14 was obtained by the same method as in Example 10, except that 28% by mass of domestically grown rice, 12% by mass of dried rice koji (*A. oryzae* No. 5100 strain), and 60% by mass of water were used, and α-amylase and pullulanase were added so as to achieve starch dextrinizing activity of not less than 1330 U and pullulanase activity of not less than 240 U per 40 g of a substrate.

Comparative Example 15

A rice-derived sweetener of Comparative Example 15 was obtained by the same method as in Example 10, except that 27% by mass of domestically grown rice, 14% by mass of dried rice koji (*A. oryzae* No. 5100 strain), and 59% by mass of water were used, and α-amylase and pullulanase were added so as to achieve starch dextrinizing activity of not less than 1287 U and pullulanase activity of not less than 246 U per 41 g of a substrate.

Example 12

A rice-derived sweetener of Example 12 was obtained by the same method as in Example 10, except that 31% by mass of domestically grown rice, 2% by mass of dried rice koji (*A.

oryzae No. 5100 strain), and 67% by mass of water were used, and α-amylase, β-amylase, and transglucosidase were added so as to achieve starch dextrinizing activity of not less than 1282 U, starch saccharifying activity of not less than 12 U, and transglucosidase activity of not less than 9900 U per 33 g of a substrate.

Example 13

A rice-derived sweetener of Example 13 was obtained by the same method as in Example 10, except that 30% by mass of domestically grown rice, 6% by mass of dried rice koji (*A. oryzae* No. 5100 strain), and 64% by mass of water were used, and α-amylase, β-amylase, and transglucosidase were added so as to achieve starch dextrinizing activity of not less than 1244 U, starch saccharifying activity of not less than 13 U, and transglucosidase activity of not less than 10800 U per 36 g of a substrate.

Example 14

A rice-derived sweetener of Example 14 was obtained by the same method as in Example 10, except that 28% by mass of domestically grown rice, 12% by mass of dried rice koji (*A. oryzae* No. 5100 strain), and 60% by mass of water were used, and α-amylase, β-amylase, and transglucosidase were added so as to achieve starch dextrinizing activity of not less than 1210 U, starch saccharifying activity of not less than 14 U, and transglucosidase activity of not less than 12000 U per 40 g of a substrate.

Example 15

A rice-derived sweetener of Example 15 was obtained by the same method as in Example 10, except that 27% by mass of domestically grown rice, 14% by mass of dried rice koji (*A. oryzae* No. 5100 strain), and 59% by mass of water were used, and α-amylase, β-amylase, and transglucosidase were added so as to achieve starch dextrinizing activity of not less than 1164 U, starch saccharifying activity of not less than 14 U, and transglucosidase activity of not less than 12300 U per 41 g of a substrate.

Example 16

As shown in Table 5, 32% by mass of domestically grown rice and 68% by mass of water were blended, and α-amylase and pullulanase were added so as to achieve starch dextrinizing activity of not less than 1374 U and pullulanase activity of not less than 192 U per 32 g of a substrate. The saccharification step and the steps subsequent thereto were carried out by the same method as in Example 10, so that a rice-derived sweetener of Example 16 was obtained.

Example 17

A rice-derived sweetener of Example 17 was obtained by the same method as in Example 16, except that 32% by mass of domestically grown rice and 68% by mass of water were blended, and α-amylase, β-amylase, and transglucosidase were added so as to achieve starch dextrinizing activity of 1278 U, starch saccharifying activity of not less than 11 U, and transglucosidase activity of not less than 9600 U per 32 g of a substrate.

Example 18

A rice-derived sweetener of Example 18 was obtained by the same method as in Example 16, except that 20% by mass of domestically grown rice and 80% by mass of water were blended, and α-amylase and pullulanase were added so as to achieve starch dextrinizing activity of not less than 890 U and pullulanase activity of not less than 120 U per 20 g of a substrate.

Example 19

A rice-derived sweetener of Example 19 was obtained by the same method as in Example 16, except that 20% by mass of domestically grown rice and 80% by mass of water were blended, and α-amylase, β-amylase, and transglucosidase were added so as to achieve starch dextrinizing activity of not less than 830 U, starch saccharifying activity of not less than 7 U, and transglucosidase activity of not less than 6000 U per 20 g of a substrate.

Example 20

A rice-derived sweetener of Example 20 was obtained by the same method as in Example 16, except that 40% by mass of domestically grown rice and 60% by mass of water were blended, and α-amylase and pullulanase were added so as to achieve starch dextrinizing activity of not less than 1730 U and pullulanase activity of not less than 240 U per 40 g of a substrate.

Example 21

A rice-derived sweetener of Example 21 was obtained by the same method as in Example 16, except that 40% by mass of domestically grown rice and 60% by mass of water were blended, and α-amylase, β-amylase, and transglucosidase were added so as to achieve starch dextrinizing activity of not less than 1610 U, starch saccharifying activity of not less than 14 U, and transglucosidase activity of not less than 12000 U per 40 g of a substrate.

TABLE 1

| | | | Production process | | | |
|---|---|---|---|---|---|---|
| NO. | Raw material blending | Enzymatic agent | Saccharification method | Pasteurization | Solid-liquid separation | Concentration |
| Example 1 | 23% by mass of pregelatinized rice 18% by mass of dried rice koji (*A. oryzae* No. 5100 strain) 59% by mass of water | α-amylase β-amylase Transglucosidase | With saccharification material other than rice koji at 53° C. for 15 hours At 53° C. for 6 hours after charging of rice koji | Pot (At 90° C. for 30 minutes) | Manual press Centrifugation (At 14,000 rpm for 3 minutes) Filtration (No. 2 Filter Paper) | Yes |

TABLE 1-continued

| NO. | Raw material blending | Enzymatic agent | Saccharification method | Pasteurization | Solid-liquid separation | Concentration |
|---|---|---|---|---|---|---|
| Example 2 | 23% by mass of pregelatinized rice 18% by mass of dried rice koji (*A. oryzae* No. 5100 strain) 59% by mass of water | α-amylase β-amylase Transglucosidase | With saccharification material other than rice koji at 53° C. for 15 hours At 53° C. for 6 hours after charging of rice koji | Pot (At 90° C. for 30 minutes) | Manual press Centrifugation (At 14,000 rpm for 3 minutes) Filtration (No. 2 Filter Paper) | Yes |
| Example 3 | 23% by mass of pregelatinized rice 18% by mass of dried rice koji (*A. oryzae* No. 5100 strain) 59% by mass of water | α-amylase β-amylase Transglucosidase | With saccharification material other than rice koji at 53° C. for 15 hours At 53° C. for 6 hours after charging of rice koji | Pot (At 90° C. for 30 minutes) | Manual press Centrifugation (At 14,000 rpm for 3 minutes) Filtration (No. 2 Filter Paper) | Yes |
| Example 4 | 30% by mass of domestically grown rice 5% by mass of dried rice koji (*A. oryzae* No. 5100 strain) 65% by mass of water | α-amylase | At 53° C. for 15 hours | Pot (At 90° C. for 30 minutes) | Manual press Centrifugation (At 14,000 rpm for 3 minutes) Filtration (No. 2 Filter Paper) | Yes |
| Example 5 | 30% by mass of domestically grown rice 5% by mass of dried rice koji (*A. oryzae* No. 5100 strain) 65% by mass of water | α-amylase Pullulanase | At 53° C. for 15 hours | Pot (At 90° C. for 30 minutes) | Manual press Centrifugation (At 14,000 rpm for 3 minutes) Filtration (No. 2 Filter Paper) | Yes |
| Example 6 | 30% by mass of domestically grown rice 5% by mass of dried rice koji (*A. oryzae* No. 5100 strain) 65% by mass of water | α-amylase β-amylase Transglucosidase | At 53° C. for 15 hours | Pot (At 90° C. for 30 minutes) | Manual press Centrifugation (At 14,000 rpm for 3 minutes) Filtration (No. 2 Filter Paper) | Yes |
| Example 7 | 30% by mass of domestically grown rice 5% by mass of dried rice koji (*A. oryzae* No. 5100 strain) 65% by mass of water | α-amylase β-amylase Transglucosidase | At 53° C. for 15 hours | Continuous heat sterilizer | Horizontal filter press | Yes |

TABLE 1-continued

| NO. | Raw material blending | Enzymatic agent | Saccharification method | Pasteurization | Solid-liquid separation | Concentration |
|---|---|---|---|---|---|---|
| Example 8 | 30% by mass of domestically grown rice 5% by mass of dried rice koji (*A. oryzae* No. 5100 strain) 65% by mass of water | α-amylase β-amylase Transglucosidase | At 53° C. for 15 hours | Pot (At 90° C. for 30 minutes) | Manual press Centrifugation (At 14,000 rpm for 3 minutes) Filtration (No. 2 Filter Paper) | Yes |
| Example 9 | 30% by mass of foreign-grown rice 5% by mass of dried rice koji (*A. oryzae* No. 5100 strain) 65% by mass of water | α-amylase β-amylase Transglucosidase | At 53° C. for 15 hours | Pot (At 90° C. for 30 minutes) | Manual press Centrifugation (At 14,000 rpm for 3 minutes) Filtration (No. 2 Filter Paper) | Yes |

TABLE 2

| NO. | Raw material blending | Enzymatic agent | Saccharification method |
|---|---|---|---|
| Comparative Example 1 | 27% by mass of domestically grown rice 14% by mass of dried rice koji (*A. oryzae* No. 5100 strain) 59% by mass of water | α-amylase | At 53° C. for 15 hours |
| Comparative Example 2 | 23% by mass of pregelatinized rice 18% by mass of dried rice koji (*A. oryzae* No. 5100 strain) 59% by mass of water | α-amylase β-amylase Transglucosidase | At 53° C. for 15 hours |
| Comparative Example 3 | 23% by mass of pregelatinized rice 18% by mass of dried rice koji (*A. kawachii* No. 5034 strain) 59% by mass of water | α-amylase β-amylase Transglucosidase | At 53° C. for 15 hours |

| NO. | Pasteurization | Solid-liquid separation | Concentration | Remarks |
|---|---|---|---|---|
| Comparative Example 1 | Continuous heat sterilizer | Horizontal filter press Filtration (0.45 μm filter) | Yes | |
| Comparative Example 2 | Pot (At 90° C. for 30 minutes) | Manual press Filtration (No. 2 Filter Paper) | Yes | |
| Comparative Example 3 | Pot (At 90° C. for 30 minutes) | Manual press Filtration (No. 2 Filter Paper) | Yes | |

TABLE 2-continued

| NO. | Raw material blending | Enzymatic agent | Saccharification method |
|---|---|---|---|
| Comparative Example 4 | 23% by mass of pregelatinized rice 18% by mass of dried rice koji (*A. oryzae* No. 5030 strain) 59% by mass of water | α-amylase β-amylase Transglucosidase | At 53° C. for 15 hours |
| Comparative Example 5 | 23% by mass of pregelatinized rice 18% by mass of dried rice koji (*A. oryzae* No. 5030 strain) 59% by mass of water | α-amylase β-amylase Transglucosidase | At 53° C. for 15 hours |
| Comparative Example 6 | 23% by mass of pregelatinized rice 18% by mass of dried rice koji (*A. oryzae* No. 5100 strain) 59% by mass of water | α-amylase β-amylase Transglucosidase | At 53° C. for 15 hours |

| NO. | Pasteurization | Solid-liquid separation | Concentration | Remarks |
|---|---|---|---|---|
| Comparative Example 4 | Pot (At 90° C. for 30 minutes) | Manual press Filtration (No. 2 Filter Paper) | Yes | |
| Comparative Example 5 | Pot (At 90° C. for 30 minutes) | Manual press Centrifugation (At 14,000 rpm for 10 minutes) Filtration (No. 2 Filter Paper) | Yes | |
| Comparative Example 6 | Pot (At 90° C. for 30 minutes) | Manual press Centrifugation (At 14,000 rpm for 10 minutes) Filtration (No. 2 Filter Paper) | Yes | |

| NO. | Raw material blending | Enzymatic agent | Saccharification method |
|---|---|---|---|
| Comparative Example 7 | 27% by mass of domestically grown rice 14% by mass of dried rice koji (*A. oryzae* No. 5100 strain) 59% by mass of water | α-amylase | At 53° C. for 15 hours |

| NO. | Pasteurization | Solid-liquid separation | Concentration | Remarks |
|---|---|---|---|---|
| Comparative Example 7 | Continuous heat sterilizer | Horizontal filter press Filtration (No. 2 Filter Paper) | Yes | After solid-liquid separation, addition of α-amylase, β-amylase, and transglucosidase, saccharification at 53° C. for 6 hours, and pasteurization (in pot at 90° C. for 30 minutes) |

TABLE 3

| NO. | Production process | | |
|---|---|---|---|
| | Raw material blending | Enzymatic agent | Saccharification method |
| Comparative Example 8 | 27% by mass of domestically grown rice 14% by mass of dried rice koji (*A. oryzae* No. 5100 strain) 59% by mass of water | α-amylase | At 53° C. for 15 hours |
| Comparative Example 9 | 27% by mass of domestically grown rice 14% by mass of dried rice koji (*A. oryzae* No. 5100 strain) 59% by mass of water | α-amylase | At 53° C. for 15 hours |
| Comparative Example 10 | 35% by mass of pregelatinized rice 6% by mass of dried rice koji (*A. oryzae* No. 5100 strain) 59% by mass of water | β-amylase | At 53° C. for 15 hours |

| NO. | Production process | | | |
|---|---|---|---|---|
| | Pasteurization | Solid-liquid separation | Concentration | Remarks |
| Comparative Example 8 | Continuous heat sterilizer | Horizontal filter press Filtration (No. 2 Filter Paper) | Yes | After concentration, addition of α-amylase, β-amylase, and transglucosidase, saccharification at 53° C. for 6 hours, and pasteurization (in pot at 90° C. for 30 minutes) |
| Comparative Example 9 | Continuous heat sterilizer | Horizontal filter press Filtration (No. 2 Filter Paper) | Yes | After concentration, addition of glucoamylase, saccharification at 53° C. for 6 hours, and pasteurization (in pot at 90° C. for 30 minutes) |
| Comparative Example 10 | Pot (At 90° C. for 30 minutes) | Manual press Centrifugation (At 14,000 rpm for 3 minutes) Filtration (No. 2 Filter Paper) | Yes | |

| NO. | Production process | | |
|---|---|---|---|
| | Raw material blending | Enzymatic agent | Saccharification method |
| Comparative Example 11 | 35% by mass of pregelatinized rice 6% by mass of dried rice koji (*A. oryzae* No. 5100 strain) 59% by mass of water | α-amylase | At 53° C. for 15 hours |
| Comparative Example 12 | Rice koji-derived sweetener manufactured by Company A (Rice koji Water) | ? | ? |
| Comparative Example 13 | Amazake manufactured by Company B (Rice koji (Rice-polishing ratio: 35%) Water) | ? | ? |

| NO. | Production process | | | |
|---|---|---|---|---|
| | Pasteurization | Solid-liquid separation | Concentration | Remarks |
| Comparative Example 11 | Pot (At 90° C. for 30 minutes) | Manual press Centrifugation (At 14,000 rpm for 3 minutes) Filtration (No. 2 Filter Paper) | Yes | |

TABLE 3-continued

| | | | |
|---|---|---|---|
| Comparative Example 12 | ? | ? | ? |
| Comparative Example 13 | ? | Manual press Filtration (No. 2 Filter Paper) | Yes | After solid-liquid separation, addition of α-amylase, β-amylase, and transglucosidase, saccharification at 53° C. for 6 hours, and pasteurization (in pot at 90° C. for 30 minutes) |

| | Production process | | |
|---|---|---|---|
| NO. | Raw material blending | Enzymatic agent | Saccharification method |
| Comparative Example 14 | 28% by mass of domestically grown rice 12% by mass of dried rice koji (*A. oryzae* No. 5100 strain) 60% by mass of water | α-amylase Pullulanase | At 53° C. for 15 hours |
| Comparative Example 15 | 27% by mass of domestically grown rice 14% by mass of dried rice koji (*A. oryzae* No. 5100 strain) 59% by mass of water | α-amylase Pullulanase | At 53° C. for 15 hours |

| | Production process | | | |
|---|---|---|---|---|
| NO. | Pasteurization | Solid-liquid separation | Concentration | Remarks |
| Comparative Example 14 | Pot (At 90° C. for 30 minutes) | Manual press Centrifugation (At 14,000 rpm for 10 minutes) Filtration (No. 2 Filter Paper) | Yes | |
| Comparative Example 15 | Pot (At 90° C. for 30 minutes) | Manual press Centrifugation (At 14,000 rpm for 10 minutes) Filtration (No. 2 Filter Paper) | Yes | |

TABLE 4

| | Production process | | | | | |
|---|---|---|---|---|---|---|
| NO. | Raw material blending | Enzymatic agent | Saccharification method | Pasteurization | Solid-liquid separation | Concentration |
| Example 10 | 31% by mass of domestically grown rice 2% by mass of dried rice koji (*A. oryzae* No. 5100 strain) 67% by mass of water | α-amylase Pullulanase | At 53° C. for 15 hours | Pot (At 90° C. for 30 minutes) | Manual press Centrifugation (At 14,000 rpm for 10 minutes) Filtration (No. 2 Filter Paper) | Yes |

TABLE 4-continued

| | Production process | | | | | |
|---|---|---|---|---|---|---|
| NO. | Raw material blending | Enzymatic agent | Saccharification method | Pasteurization | Solid-liquid separation | Concentration |
| Example 11 | 30% by mass of domestically grown rice 6% by mass of dried rice koji (*A. oryzae* No. 5100 strain) 64% by mass of water | α-amylase Pullulanase | At 53° C. for 15 hours | Pot (At 90° C. for 30 minutes) | Manual press Centrifugation (At 14,000 rpm for 10 minutes) Filtration (No. 2 Filter Paper) | Yes |
| Example 12 | 31% by mass of domestically grown rice 2% by mass of dried rice koji (*A. oryzae* No. 5100 strain 67% by mass of water | α-amylase β-amylase Transglucosidase | At 53° C. for 15 hours | Pot (At 90° C. for 30 minutes) | Manual press Centrifugation (At 14,000 rpm for 10 minutes) Filtration (No. 2 Filter Paper) | Yes |
| Example 13 | 30% by mass of domestically grown rice 6% by mass of dried rice koji (*A. oryzae* No. 5100 strain) 64% by mass of water | α-amylase β-amylase Transglucosidase | At 53° C. for 15 hours | Pot (At 90° C. for 30 minutes) | Manual press Centrifugation (At 14,000 rpm for 10 minutes) Filtration (No. 2 Filter Paper) | Yes |
| Example 14 | 28% by mass of domestically grown rice 12% by mass of dried rice koji (*A. oryzae* No. 5100 strain) 60% by mass of water | α-amylase β-amylase Transglucosidase | At 53° C. for 15 hours | Pot (At 90° C. for 30 minutes) | Manual press Centrifugation (At 14,000 rpm for 10 minutes) Filtration (No. 2 Filter Paper) | Yes |
| Example 15 | 27% by mass of domestically grown rice 14% by mass of dried rice koji (*A. oryzae* No. 5100 strain) 59% by mass of water | α-amylase β-amylase Transglucosidase | At 53° C. for 15 hours | Pot (At 90° C. for 30 minutes) | Manual press Centrifugation (At 14,000 rpm for 10 minutes) Filtration (No. 2 Filter Paper) | Yes |

TABLE 5

| NO. | Raw material blending | Enzymatic agent | Saccharification method | Pasteurization | Solid-liquid separation | Concentration |
|---|---|---|---|---|---|---|
| | | | Production process | | | |
| Example 16 | 32% by mass of domestically grown rice 68% by mass of water | α-amylase Pullulanase | At 53° C. for 15 hours | Pot (At 90° C. for 30 minutes) | Manual press Centrifugation (At 14,000 rpm for 10 minutes) Filtration (No. 2 Filter Paper) | Yes |
| Example 17 | 32% by mass of domestically grown rice 68% by mass of water | α-amylase β-amylase Transglucosidase | At 53° C. for 15 hours | Pot (At 90° C. for 30 minutes) | Manual press Centrifugation (At 14,000 rpm for 10 minutes) Filtration (No. 2 Filter Paper) | Yes |
| Example 18 | 20% by mass of domestically grown rice 80% by mass of water | α-amylase Pullulanase | At 53° C. for 15 hours | Pot (At 90° C. for 30 minutes) | Manual press Centrifugation (At 14,000 rpm for 10 minutes) Filtration (No. 2 Filter Paper) | Yes |
| Example 19 | 20% by mass of domestically grown rice 80% by mass of water | α-amylase β-amylase Transglucosidase | At 53° C. for 15 hours | Pot (At 90° C. for 30 minutes) | Manual press Centrifugation (At 14,000 rpm for 10 minutes) Filtration (No. 2 Filter Paper) | Yes |
| Example 20 | 40% by mass of domestically grown rice 60% by mass of water | α-amylase Pullulanase | At 53° C. for 15 hours | Pot (At 90° C. for 30 minutes) | Manual press Centrifugation (At 14,000 rpm for 10 minutes) Filtration (No. 2 Filter Paper) | Yes |
| Example 21 | 40% by mass of domestically grown rice 60% by mass of water | α-amylase β-amylase Transglucosidase | At 53° C. for 15 hours | Pot (At 90° C. for 30 minutes) | Manual press Centrifugation (At 14,000 rpm for 10 minutes) Filtration (No. 2 Filter Paper) | Yes |

<Determination of Presence or Absence of Crystallization>

The rice-derived sweeteners of Examples and Comparative Examples were each preserved at an ordinary temperature (25° C.), and the presence or absence of crystallization was determined. Tables 6 to 9 show results. As a result, no crystallization was observed in each of the rice-derived sweeteners of Examples 1 to 21 even after the elapse of 45 days. In contrast, in each of the rice-derived sweeteners of Comparative Examples 1 to 15, crystallization was observed within 1 week after preservation at the earliest and after the elapse of 1 and a half months from preservation at the latest.

<Analysis of Rice-Derived Sweetener>

The rice-derived sweeteners of Examples and Comparative Examples were each subjected to the following analysis.
(Measurement of Brix)
A refractometer was used to measure Brix.
(Measurement of Water Activity (Aw))
An electric resistance type was used to measure water activity (Aw).
(Measurement of Amount of Sugar Such as Glucose)
Amounts of glucose, maltose, isomaltose, maltotriose, panose, and isomaltotriose that were contained in the rice-derived sweeteners were measured by a high performance liquid chromatography method.

Tables 6 to 9 show results. Although not shown in Table 6, in rice-derived sweeteners prepared by a production method similar to that in Example 7 and having a Brix of 70%, 71%, 72%, 73%, 74%, 75%, 76%, 77%, 78%, 79%, and 80%, crystallization was not observed under temperature conditions of an ordinary temperature, 5° C., and 30° C. even after preservation for 12 months. Furthermore, among those rice-derived sweeteners, in the rice-derived sweeteners having a Brix of 71% to 76%, no crystallization was observed under a temperature condition of −20° C. even after preservation for 12 months.

Figure 2:
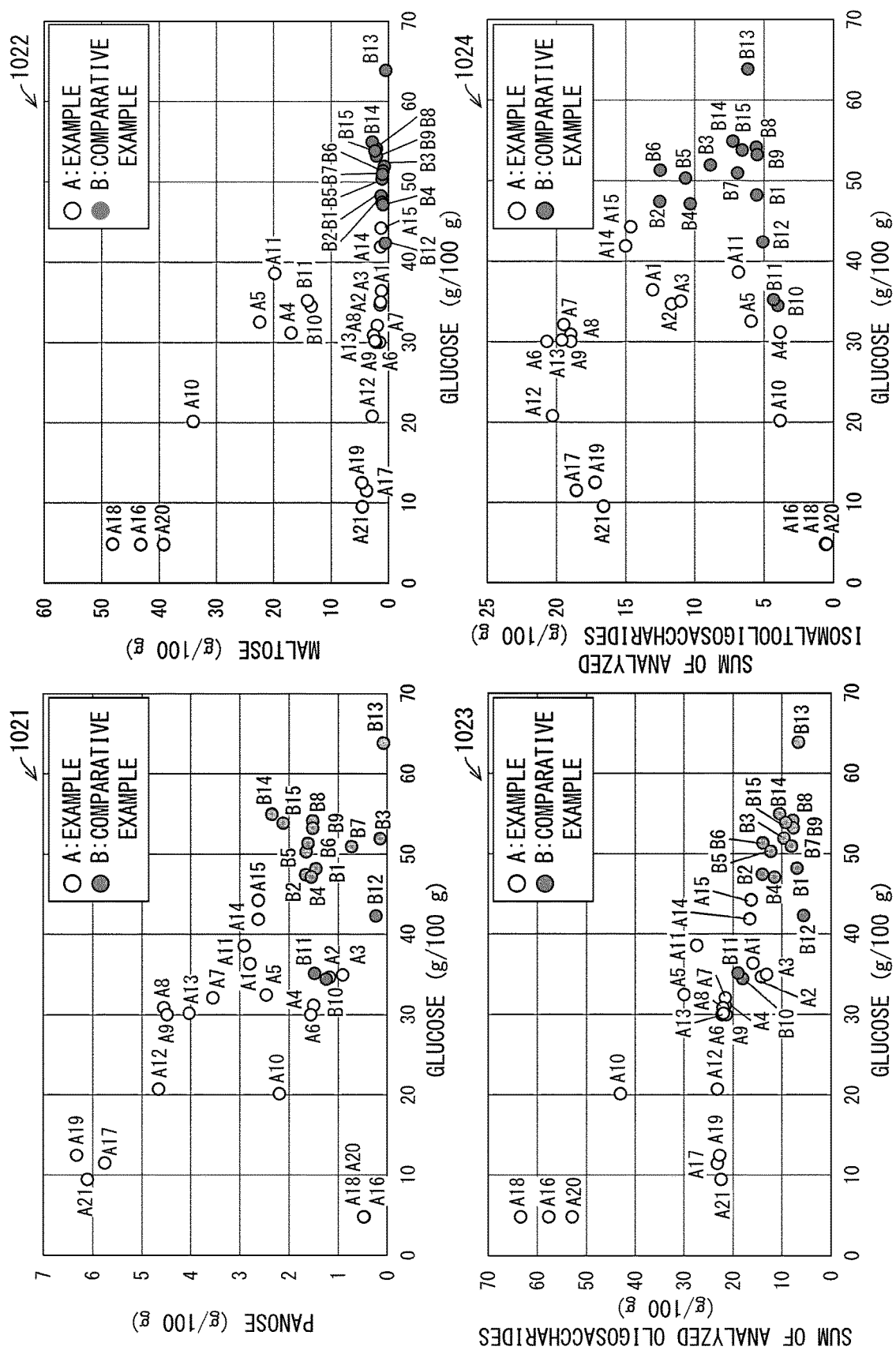
FIG. 2 is a diagram showing amounts of various saccharides contained in the rice-derived sweeteners of Examples and Comparative Examples of the present invention.

Moreover, a relation between amounts of saccharides contained in rice-derived sweeteners and a crystallization inhibition effect was analyzed. FIG. 1 is a diagram showing amounts of glucose and three saccharides contained in rice-derived sweeteners of Examples and Comparative Examples. FIG. 2 is a diagram showing amounts of various saccharides contained in rice-derived sweeteners of Examples and Comparative Examples.

As shown in FIG. 1, the rice-derived sweeteners of Examples 1 to 21 in which crystallization was inhibited exhibited a tendency to contain glucose in a smaller amount than the rice-derived sweeteners of Comparative Examples.

Further, the rice-derived sweeteners of Examples 1 to 21 in which crystallization was inhibited exhibited a tendency to contain three saccharides (panose, maltotriose, and isomaltotriose) in a larger total amount than the rice-derived sweeteners of Comparative Examples. A thick solid line that is shown in FIG. 1 and that is parallel to the horizontal axis indicates a position at which the three saccharides are contained in a total amount of 1.96 g per 100 g of a rice-derived sweetener, and a thick solid line that is shown in FIG. 1 and that is parallel to the vertical axis indicates a position at which glucose is contained in an amount of 47.2 g per 100 g of the rice-derived sweetener.

From this result, it was considered that the crystallization inhibition effect was obtained in a case where glucose was contained in an amount of less than 47.2 g per 100 g of the rice-derived sweetener (i.e., glucose was contained in an amount of less than 47.2% by mass relative to a total mass of the rice-derived sweetener), and three saccharides (panose, maltotriose, and isomaltotriose) were contained in a total amount of more than 1.96 g per 100 g of the rice-derived sweetener (i.e., the three saccharides were contained in an amount of more than 1.96% by mass relative to the total mass of the rice-derived sweetener).

A region enclosed by a dashed line in FIG. 1 represents a result of rice-derived sweeteners produced by production methods of Examples 4 to 10, 12 and 13, and 16 to 21 in which rice koji was contained in an amount of not more than 6% by mass relative to a total mass of 100% by mass of a saccharification material. A region enclosed by a dash-dot line in FIG. 1 represents a result of rice-derived sweeteners produced by production methods of Examples 1 to 3, 11, 14, and 15 in which rice koji was contained in an amount of not less than 6% by mass relative to a total mass of 100% by mass of a saccharification material. In the production methods of Examples 1 to 3, 11, 14, and 15, the rice koji was blended in the saccharification material in a larger amount than in the production methods of Examples 4 to 10, 12 and 13, and 16 to 21. Thus, the rice-derived sweeteners of Examples 1 to 3, 11, 14, and 15 exhibited a tendency to contain glucose in a larger amount than the rice-derived sweeteners of Examples 4 to 10, 12 and 13, and 16 to 21.

Furthermore, a relation between amounts of other saccharides contained in rice-derived sweeteners and a crystallization inhibition effect of the rice-derived sweeteners was also analyzed. 1021 of FIG. 2 shows amounts of glucose and panose that are contained in each rice-derived sweetener. As compared with the rice-derived sweeteners of Examples, the rice-derived sweeteners of Comparative Examples exhibited a tendency as a whole to contain panose in a smaller amount. In contrast, the rice-derived sweeteners of Examples did not exhibit any particularly clear tendency regarding the amount of panose, and some of those rice-derived sweeteners contained panose in a smaller amount than the rice-derived sweeteners of Comparative Examples. Thus, no clear relation was observed between the contained amount of panose only among the three saccharides described earlier and the crystallization inhibition effect.

1022 of FIG. 2 shows amounts of glucose and maltose that are contained in each rice-derived sweetener. No clear relation was observed between the contained amount of maltose and the crystallization inhibition effect.

1023 of FIG. 2 shows an amount of glucose contained in each rice-derived sweetener and a total contained amount of analyzed oligosaccharides (maltose, isomaltose, maltotriose, panose, and isomaltotriose). As compared with the rice-derived sweeteners of Comparative Examples, the rice-derived sweeteners of Examples exhibited a tendency as a whole to contain the analyzed oligosaccharides in a larger total amount. However, some of the rice-derived sweeteners of Comparative Examples contained the analyzed oligosaccharides in a large total amount, and no clear relation was observed between the total contained amount of the analyzed oligosaccharides and the crystallization inhibition effect.

1024 of FIG. 2 shows an amount of glucose contained in each rice-derived sweetener and a total contained amount of analyzed isomaltooligosaccharides (specifically, isomaltose, panose, and isomaltotriose). The rice-derived sweeteners of Examples did not exhibit any particularly clear tendency regarding the total contained amount of the isomaltooligosaccharides. Some of the rice-derived sweeteners of Examples contained the isomaltooligosaccharides in a smaller total amount than the rice-derived sweeteners of Comparative Examples. Thus, no clear relation was observed between the total contained amount of the isomaltooligosaccharides and the crystallization inhibition effect.

TABLE 6

| NO. | Bx after concentration | Aw after concentration (water activity) | Glucose (g/100 g) | Maltose (g/100 g) | Isomaltose (g/100 g) | Maltotriose (g/100 g) | Panose (g/100 g) | Isomaltotriose (g/100 g) |
|---|---|---|---|---|---|---|---|---|
| Example 1 | 74.4 | — | 36.4 | 1.14 | 7.59 | 1.69 | 2.79 | 2.64 |
| Example 2 | 73.0 | — | 34.7 | 1.38 | 9.34 | 1.08 | 1.17 | 1.16 |
| Example 3 | 72.0 | — | 35.0 | 1.36 | 9.08 | 0.80 | 0.90 | 1.01 |
| Example 4 | 72.5 | 0.758 | 31.2 | 16.90 | 2.33 | 0.77 | 1.49 | 0.00 |
| Example 5 | 72.2 | 0.753 | 32.5 | 22.40 | 3.46 | 1.63 | 2.46 | 0.00 |
| Example 6 | 73.3 | 0.771 | 30.0 | 1.52 | 14.00 | 0.00 | 1.55 | 5.14 |
| Example 7 | 72.0 | 0.773 | 32.1 | 1.90 | 12.80 | 0.20 | 3.54 | 3.11 |
| Example 8 | 73.9 | 0.745 | 30.9 | 2.55 | 11.70 | 0.49 | 4.55 | 2.70 |
| Example 9 | 73.7 | 0.745 | 30.0 | 2.12 | 11.70 | 0.28 | 4.48 | 2.78 |

TABLE 6-continued

| NO. | Sum total of analyzed oligosaccharides (g/100 g) | Sum total of analyzed isomaltooligosaccharides (g/100 g) | Proportion of isomaltooligosaccharide to glucose (% by mass) | Sum total of analyzed three saccharides (g/100 g) | Crystallization Presence or absence of crystallization | Time until crystallization |
|---|---|---|---|---|---|---|
| Example 1 | 15.85 | 13.02 | 35.77 | 7.12 | Absent | — |
| Example 2 | 14.13 | 11.67 | 33.63 | 3.41 | Absent | — |
| Example 3 | 13.15 | 10.99 | 31.40 | 2.71 | Absent | — |
| Example 4 | 21.49 | 3.82 | 12.24 | 2.26 | Absent | — |
| Example 5 | 29.95 | 5.92 | 18.22 | 4.09 | Absent | — |
| Example 6 | 22.21 | 20.69 | 68.97 | 6.69 | Absent | — |
| Example 7 | 21.55 | 19.45 | 60.59 | 6.85 | Absent | — |
| Example 8 | 21.99 | 18.95 | 61.33 | 7.74 | Absent | — |
| Example 9 | 21.36 | 18.96 | 63.20 | 7.54 | Absent | — |

TABLE 7

| NO. | Bx after concentration | Aw after concentration (water activity) | Glucose (g/100 g) | Maltose (g/100 g) | Isomaltose (g/100 g) | Maltotriose (g/100 g) | Panose (g/100 g) | Isomaltotriose (g/100 g) |
|---|---|---|---|---|---|---|---|---|
| Comparative Example 1 | 67.6 | 0.791 | 48.3 | 1.23 | 3.90 | 0.12 | 1.44 | 0.15 |
| Comparative Example 2 | 75.4 | 0.678 | 47.5 | 1.03 | 9.44 | 0.39 | 1.65 | 1.41 |
| Comparative Example 3 | 75.9 | — | 52.0 | 0.62 | 7.70 | 0.07 | 0.14 | 1.01 |
| Comparative Example 4 | 72.9 | 0.723 | 47.2 | 0.88 | 7.80 | 0.29 | 1.54 | 0.97 |
| Comparative Example 5 | 76.1 | 0.662 | 50.4 | 1.01 | 8.08 | 0.54 | 1.64 | 0.92 |
| Comparative Example 6 | 79.9 | 0.654 | 51.4 | 0.89 | 9.59 | 0.49 | 1.60 | 1.26 |
| Comparative Example 7 | 76.9 | — | 51.0 | 0.93 | 5.83 | 0.19 | 0.72 | 0.32 |
| Comparative Example 8 | 76.9 | — | 54.2 | 2.00 | 3.86 | 0.18 | 1.51 | 0.16 |
| Comparative Example 9 | 76.9 | — | 53.3 | 2.01 | 3.79 | 0.18 | 1.51 | 0.16 |
| Comparative Example 10 | 73.0 | 0.786 | 34.5 | 13.40 | 2.76 | 0.51 | 1.23 | 0.00 |
| Comparative Example 11 | 73.2 | 0.746 | 35.2 | 14.10 | 2.81 | 0.49 | 1.47 | 0.00 |
| Comparative Example 12 | 61.9 | 0.835 | 42.4 | 0.45 | 4.40 | 0.00 | 0.22 | 0.44 |
| Comparative Example 13 | 80.9 | — | 63.9 | 0.40 | 5.67 | 0.00 | 0.07 | 0.39 |
| Comparative Example 14 | 75.7 | 0.695 | 55.0 | 2.80 | 4.68 | 0.35 | 2.34 | 0.19 |
| Comparative Example 15 | 73.4 | 0.732 | 53.9 | 2.26 | 4.28 | 0.31 | 2.11 | 0.17 |

| NO. | Sum total of analyzed oligosaccharides (g/100 g) | Sum total of analyzed isomaltoligosaccharides (g/100 g) | Proportion of isomaltooligosaccharide to glucose (% by mass) | Sum total of analyzed three saccharides (g/100 g) | Crystallization Presence or absence of crystallization | Time until crystallization |
|---|---|---|---|---|---|---|
| Comparative Example 1 | 6.84 | 5.49 | 11.37 | 1.71 | Present | Within 1 week |
| Comparative Example 2 | 13.92 | 12.50 | 26.32 | 3.45 | Present | 1.5 months |
| Comparative Example 3 | 9.54 | 8.85 | 17.02 | 1.22 | Present | Within 1 week |
| Comparative Example 4 | 11.48 | 10.31 | 21.84 | 2.80 | Present | Within 2 weeks |

TABLE 7-continued

| | | | | | | |
|---|---|---|---|---|---|---|
| Comparative Example 5 | 12.19 | 10.64 | 21.11 | 3.10 | Present | 2 weeks |
| Comparative Example 6 | 13.83 | 12.45 | 24.22 | 3.35 | Present | 2 weeks |
| Comparative Example 7 | 7.99 | 6.87 | 13.47 | 1.23 | Present | 2 weeks |
| Comparative Example 8 | 7.71 | 5.53 | 10.20 | 1.85 | Present | 2 weeks |
| Comparative Example 9 | 7.65 | 5.46 | 10.24 | 1.85 | Present | 2 weeks |
| Comparative Example 10 | 17.90 | 3.99 | 11.57 | 1.74 | Present | 1.5 months |
| Comparative Example 11 | 18.87 | 4.28 | 12.16 | 1.96 | Present | 1.5 months |
| Comparative Example 12 | 5.51 | 5.06 | 11.93 | 0.66 | Present | 1 month |
| Comparative Example 13 | 6.53 | 6.13 | 9.59 | 0.46 | Present | 1 month |
| Comparative Example 14 | 10.36 | 7.21 | 13.11 | 2.88 | Present | Within 1 week |
| Comparative Example 15 | 9.13 | 6.56 | 12.17 | 2.59 | Present | Within 1 week |

TABLE 8

| | Analysis result | | | | | | |
|---|---|---|---|---|---|---|---|
| NO. | Bx after concentration | Aw after concentration (water activity) | Glucose (g/100 g) | Maltose (g/100 g) | Isomaltose (g/100 g) | Maltotriose (g/100 g) | Panose (g/100 g) | Isomaltotriose (g/100 g) |
| Example 10 | 74.1 | 0.778 | 20.2 | 34.00 | 1.62 | 5.19 | 2.19 | 0.00 |
| Example 11 | 72.5 | 0.710 | 38.6 | 19.80 | 3.80 | 0.69 | 2.90 | 0.13 |
| Example 12 | 72.0 | 0.803 | 20.8 | 2.83 | 11.50 | 0.00 | 4.65 | 4.13 |
| Example 13 | 74.6 | 0.747 | 30.2 | 2.29 | 12.50 | 0.00 | 4.03 | 3.06 |
| Example 14 | 73.4 | 0.734 | 41.9 | 1.33 | 10.60 | 0.26 | 2.62 | 1.78 |
| Example 15 | 75.3 | 0.708 | 44.3 | 1.26 | 10.40 | 0.31 | 2.62 | 1.63 |

| | Analysis result | | | | Crystallization | |
|---|---|---|---|---|---|---|
| NO. | Sum total of analyzed oligosaccharides (g/100 g) | Sum total of analyzed isomaltooligosaccharides (g/100 g) | Proportion of isomaltooligosaccharide to glucose (% by mass) | Sum total of analyzed three saccharides (g/100 g) | Presence or absence of crystallization | Time until crystallization |
| Example 10 | 43.00 | 3.81 | 18.86 | 7.38 | Absent | — |
| Example 11 | 27.32 | 6.83 | 17.69 | 3.72 | Absent | — |
| Example 12 | 23.11 | 20.28 | 97.50 | 8.78 | Absent | — |
| Example 13 | 21.88 | 19.59 | 64.87 | 7.09 | Absent | — |
| Example 14 | 16.59 | 15.00 | 35.80 | 4.66 | Absent | — |
| Example 15 | 16.22 | 14.65 | 33.07 | 4.56 | Absent | — |

TABLE 9

| | Analysis result | | | | | | |
|---|---|---|---|---|---|---|---|
| NO. | Bx after concentration | Aw after concentration (water activity) | Glucose (g/100 g) | Maltose (g/100 g) | Isomaltose (g/100 g) | Maltotriose (g/100 g) | Panose (g/100 g) | Isomaltotriose (g/100 g) |
| Example 16 | 75.2 | 0.807 | 4.83 | 43.20 | 0.09 | 13.90 | 0.47 | 0.00 |
| Example 17 | 75.3 | 0.804 | 11.50 | 3.75 | 8.56 | 0.86 | 5.75 | 4.25 |
| Example 18 | 74.5 | 0.791 | 4.85 | 48.10 | 0.06 | 14.70 | 0.48 | 0.00 |
| Example 19 | 71.9 | 0.836 | 12.50 | 4.63 | 7.85 | 0.86 | 6.32 | 3.03 |
| Example 20 | 72.6 | 0.836 | 4.83 | 39.20 | 0.00 | 13.20 | 0.48 | 0.00 |
| Example 21 | 73.9 | 0.835 | 9.51 | 4.49 | 7.07 | 1.26 | 6.10 | 3.43 |

TABLE 9-continued

| NO. | Analysis result | | | | Crystallization | |
| --- | --- | --- | --- | --- | --- | --- |
| | Sum total of analyzed oligosaccharides (g/100 g) | Sum total of analyzed isomaltooligosaccharides (g/100 g) | Proportion of isomaltooligosaccharide to glucose (% by mass) | Sum total of analyzed three saccharides (g/100 g) | Presence or absence of crystallization | Time until crystallization |
| Example 16 | 57.66 | 0.56 | 11.59 | 14.37 | Absent | — |
| Example 17 | 23.17 | 18.56 | 161.39 | 10.86 | Absent | — |
| Example 18 | 63.34 | 0.54 | 11.13 | 15.18 | Absent | — |
| Example 19 | 22.69 | 17.20 | 137.60 | 10.21 | Absent | — |
| Example 20 | 52.88 | 0.48 | 9.94 | 13.68 | Absent | — |
| Example 21 | 22.35 | 16.60 | 174.65 | 10.79 | Absent | — |

INDUSTRIAL APPLICABILITY

The present invention can be used as a sweetener mainly in the field of food products.

The invention claimed is:

1. A rice-derived sweetener comprising:
a rice-derived component;
glucose; and
at least one saccharide selected from the group consisting of panose, maltotriose, and isomaltotriose,
the at least one saccharide being any one of the following (a) to (f):
(a) panose;
(b) isomaltotriose;
(c) panose and maltotriose;
(d) panose and isomaltotriose;
(e) maltotriose and isomaltotriose; and
(f) panose, maltotriose, and isomaltotriose,
the glucose being contained in an amount of not less than 4.0% by mass and less than 47.2% by mass relative to a total mass of the rice-derived sweetener, and
a total amount of the panose, the maltotriose, and the isomaltotriose being more than 1.96% by mass and not more than 16.00% by mass relative to the total mass of the rice-derived sweetener.

2. The rice-derived sweetener as set forth in claim 1, wherein the glucose is contained in an amount of not less than 4.0% by mass and not more than 45.00% by mass relative to the total mass of the rice-derived sweetener, and
a total amount of the panose, the maltotriose, and the isomaltotriose is not less than 2.00% by mass and not more than 15.50% by mass relative to the total mass of the rice-derived sweetener.

3. A rice-derived sweetener as set forth in claim 1, further comprising isomaltose,
a total amount of the isomaltose, the panose, and the isomaltotriose is not less than 0.4% by mass and not more than 23.00% by mass relative to the total mass of the rice-derived sweetener.

4. The rice-derived sweetener as set forth in claim 1, wherein the rice-derived sweetener has a Brix of not less than 70% and not more than 80%.

5. The rice-derived sweetener as set forth in claim 1, wherein the rice-derived sweetener has a water activity of not less than 0.60 and not more than 0.85.

6. A food product comprising a rice-derived sweetener recited in claim 1.

7. A method for producing a rice-derived sweetener recited in claim 1, comprising:
a saccharification step of saccharifying a saccharification material containing rice, water, and an enzymatic agent;
a solid-liquid separation step of subjecting a saccharified product obtained in the saccharification step to solid-liquid separation so as to obtain a saccharified solution; and
a concentration step of concentrating the saccharified solution.

8. The method as set forth in claim 7, wherein the saccharification material contains rice koji in an amount of not less than 2% by mass and less than 14% by mass relative to a total mass of 100% by mass of the saccharification material.

9. The method as set forth in claim 7, wherein the saccharification step includes:
a first saccharification step of saccharifying a first saccharification material containing rice, water, and an enzymatic agent; and
a second saccharification step of saccharifying a second saccharification material containing rice koji and a first saccharified product obtained in the first saccharification step.

10. The method as set forth in claim 9, wherein the second saccharification material contains the rice koji in an amount of not less than 2% by mass and not more than 20% by mass relative to a total mass of 100% by mass of the second saccharification material.

* * * * *